M. R. HUTCHISON.
RIM AND TIRE FOR VEHICLE WHEELS.
APPLICATION FILED JULY 28, 1909.
1,038,144.
Patented Sept. 10, 1912.
4 SHEETS—SHEET 1.
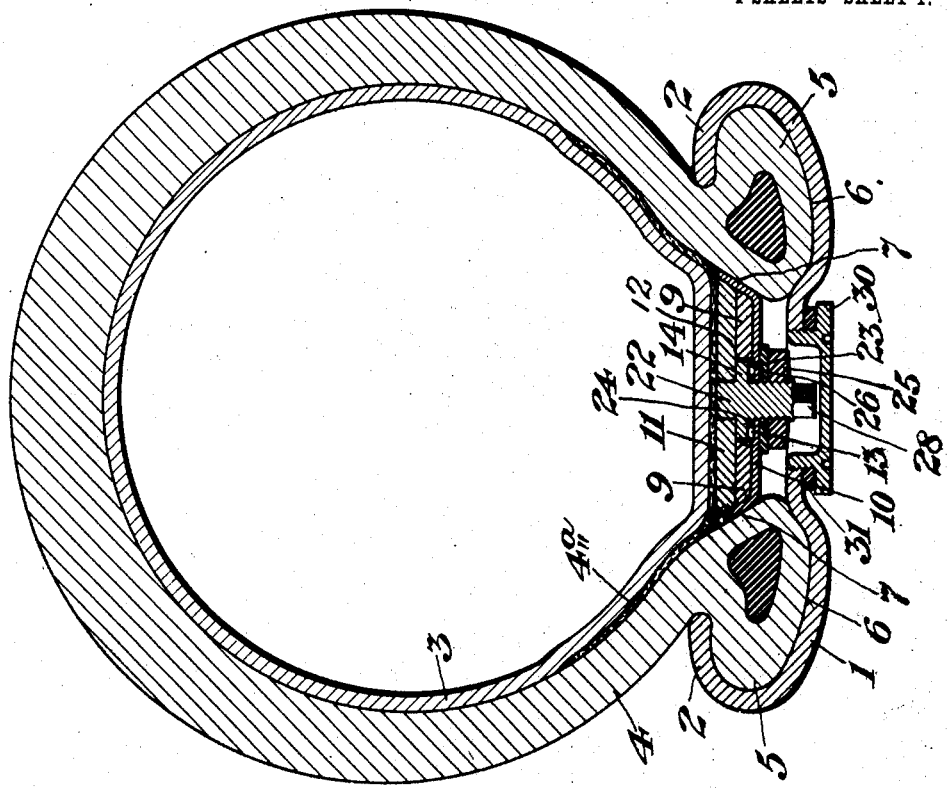
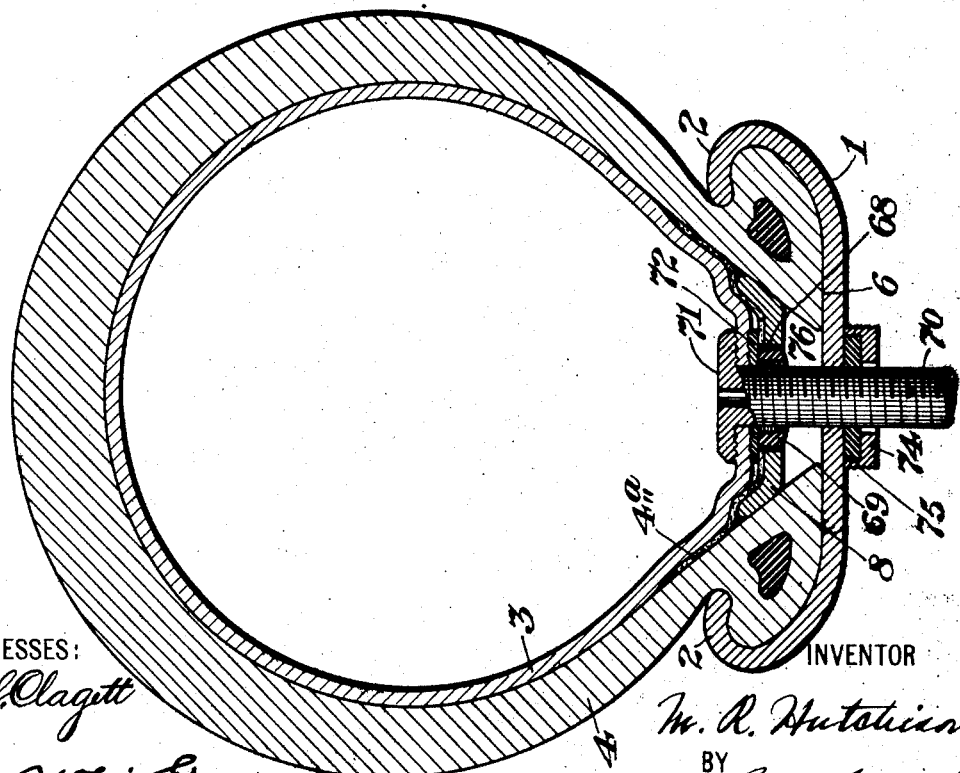
WITNESSES:
Chas. F. Clagett
Irving M. Obright
INVENTOR
M. R. Hutchison
BY G. C. Shoe
his ATTORNEY M. R. HUTCHISON.
RIM AND TIRE FOR VEHICLE WHEELS.
APPLICATION FILED JULY 28, 1909.
1,038,144.
Patented Sept. 10, 1912.
4 SHEETS—SHEET 2.
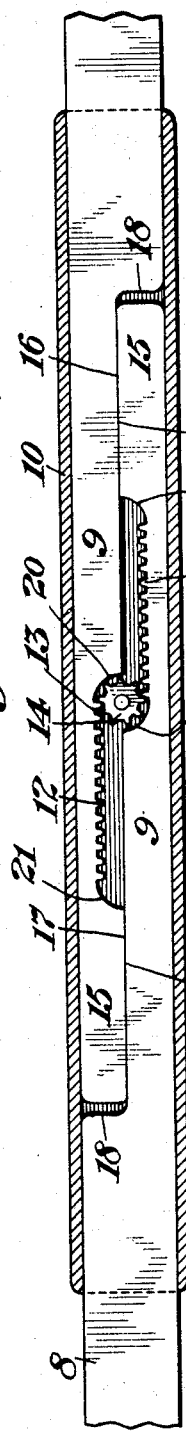
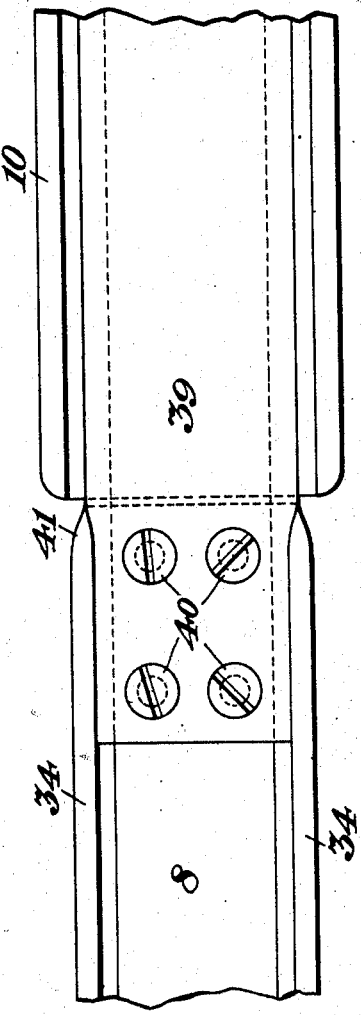
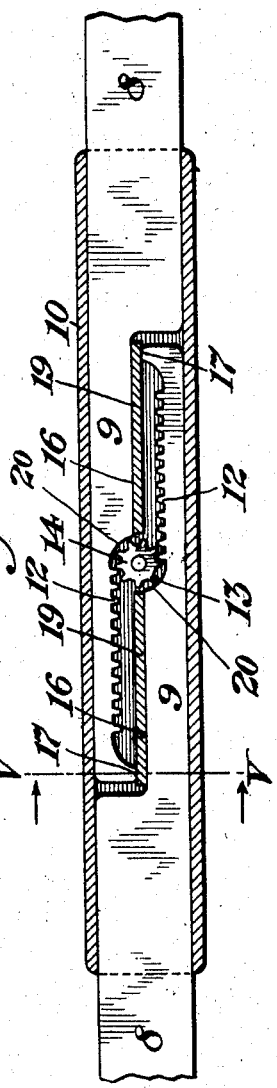
WITNESSES:
Chas. F. Clagett
Irving McKnight
INVENTOR
M. R. Hutchison
BY
G. C. Dean
his ATTORNEY M. R. HUTCHISON.
RIM AND TIRE FOR VEHICLE WHEELS.
APPLICATION FILED JULY 28, 1909.
1,038,144.
Patented Sept. 10, 1912.
4 SHEETS—SHEET 3.
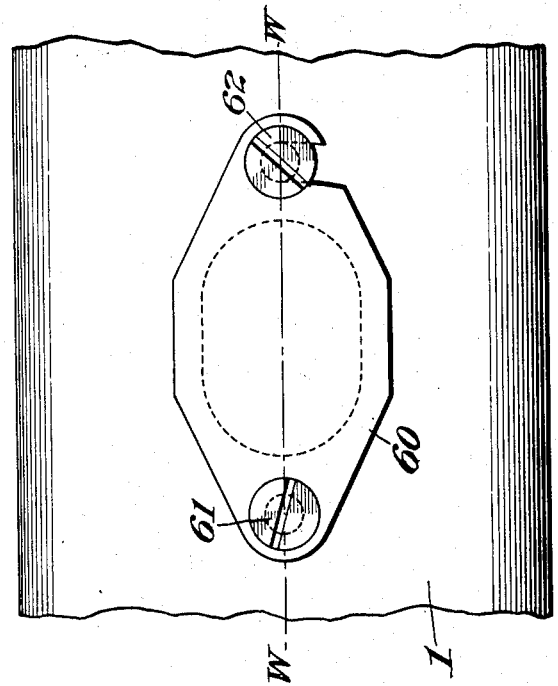
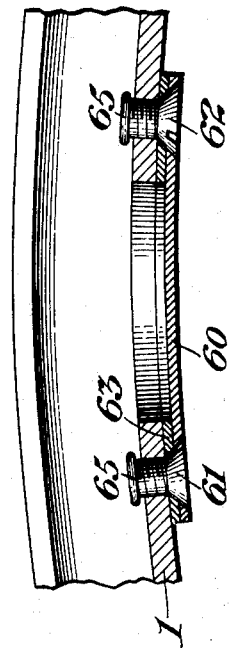
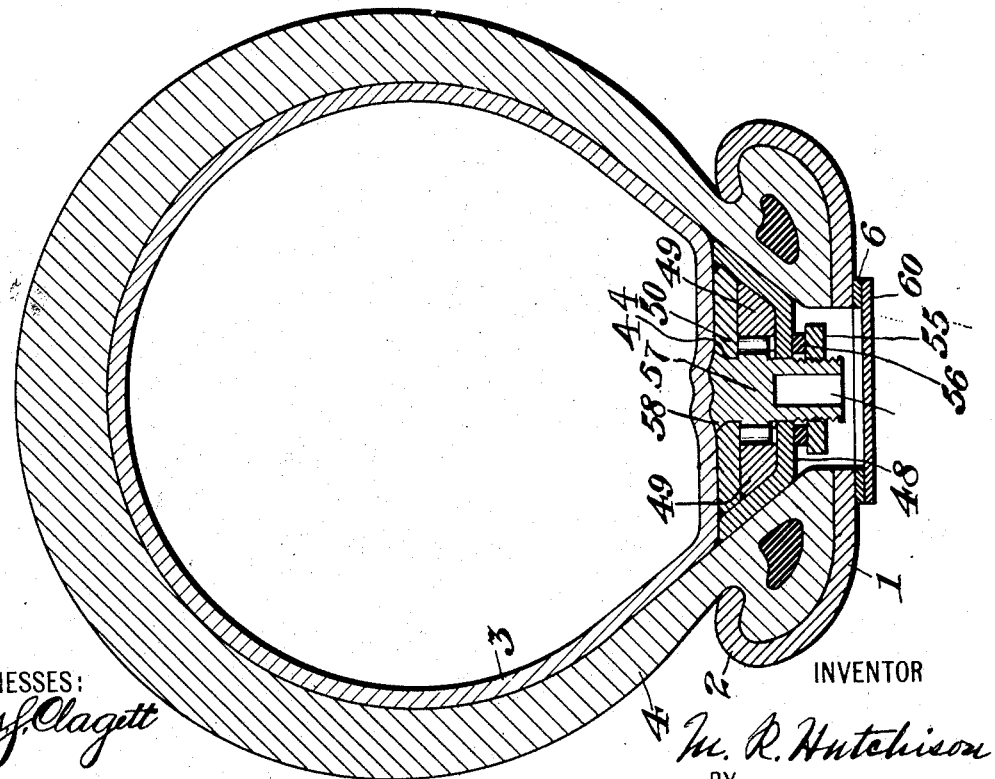
WITNESSES:
INVENTOR
M. R. Hutchison
BY
G. C. Dean
his ATTORNEY

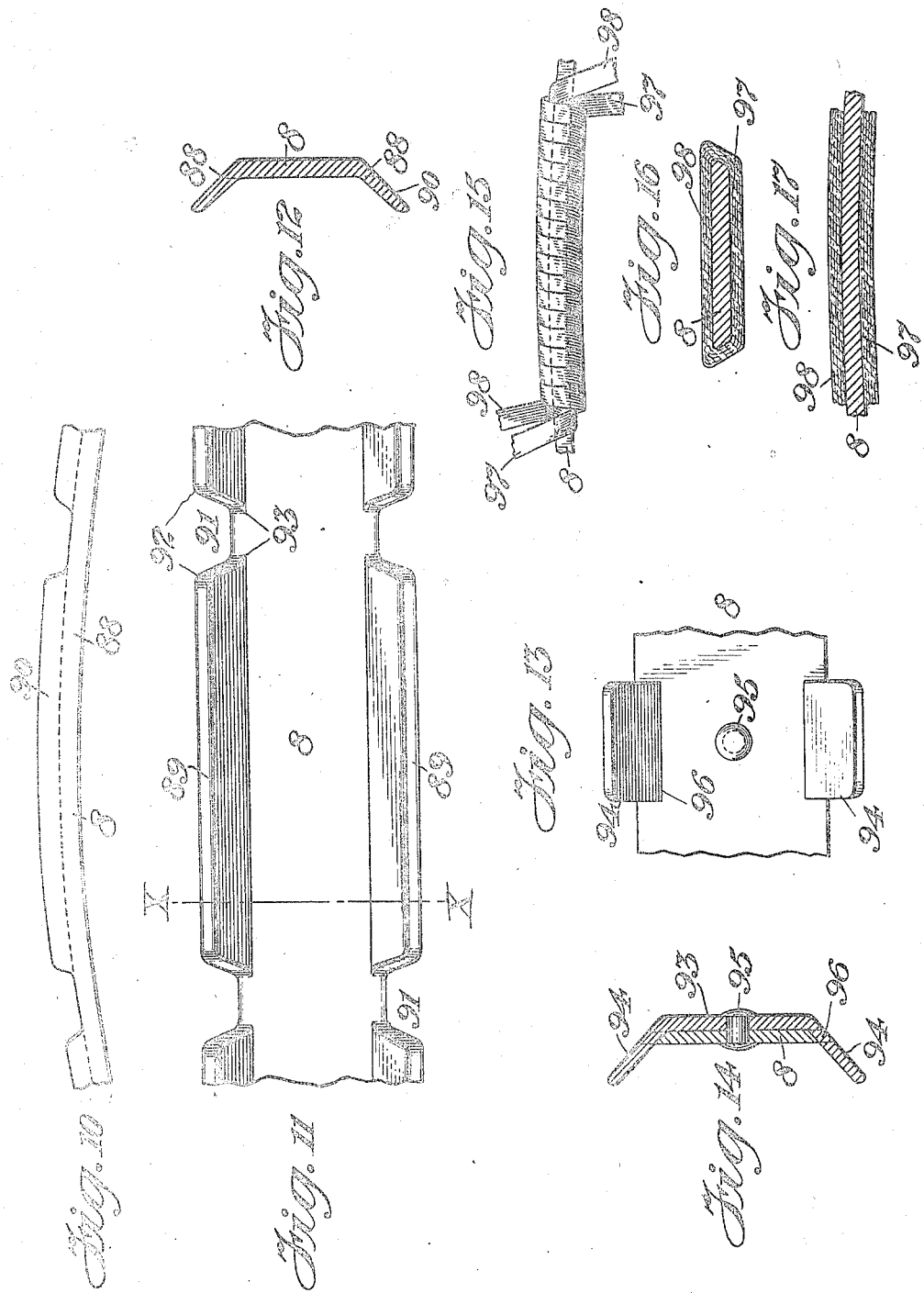

UNITED STATES PATENT OFFICE.

MILLER REESE HUTCHISON, OF SUMMIT, NEW JERSEY.

RIM AND TIRE FOR VEHICLE-WHEELS.

1,038,144.  Specification of Letters Patent.  Patented Sept. 10, 1912.

Application filed July 28, 1909. Serial No. 510,134.

*To all whom it may concern:*

Be it known that I, MILLER REESE HUTCHISON, a citizen of the United States, and a resident of Summit, in the county of Union and State of New Jersey, have invented certain new and useful Improvements in Rims and Tires for Vehicle-Wheels, of which the following is a specification.

My present invention relates particularly to wheel rims and tires of the type commonly used on passenger carrying automobiles. Such tires commonly comprise an outer inexpansible shoe, an elastic inner air tube, and means independent of the inner air pressure for securing the shoe to the wheel. The cushioning qualities of such tires are satisfactory, but they are liable to puncture and collapse, when the inner tube is injured as by external puncture, by internal pinching or chafing, or by tools used in removing or replacing the shoe, and the principal object of my invention has been to prevent damage from any of these causes and also to minimize the loss of time when repairs and renewals are necessary.

One of the most desirable ways of saving time in the renewals when on the road, is to make the tire and rim detachable from the wheel, so that it may be removed and a spare rim with fully inflated tire substituted. A desirable arrangement for this purpose forms the subject of my prior application Serial No. 492,946, filed April 29, 1909. In said application, I have shown the rim as formed with a cylindrical inner bearing surface corresponding to the peripheral surface of the felly and having the shoe and its securing means applied thereto in such manner that only the valve stem projects through the felly. As this single projection may be inserted through a radial hole in the felly and the rim then swung into the plane of the wheel, no other perforations or weakening recesses in the felly are necessary. My present invention, though readily adaptable for other uses, was actually devised in connection with such a detachable or demountable rim, and it includes a special construction of means for positively securing the shoe to the rim, preferably without the use of any radial bolts, nuts, or other securing means projecting from the rim toward the felly. It includes special features whereby the shoe may be detached from and attached to the rim quickly, without liability of accident to the inner tube by pinching with the tire irons, and these features are of general utility in connection with rims which are not demountable.

For purposes of my invention, I employ a shoe, comprising an outer tube split on the inner side. The shoe is formed with two laterally projecting annular beads adapted to interlock with corresponding annular inturned flanges on the rim of the wheel. Externally, the walls are molded to an approximately cylindrical surface adapted to fit the bottom of the wheel rim, and internally, the surfaces converge so that the edges of the split are V-shaped, forming what are called the toes of the shoe and the interior surfaces adjacent the split converge so that the space between the toes is wedge shaped.

In designing a continuous securing band or lock strip in accordance with my invention, it is desirable to employ a peripherally flexible construction adapted to maintain a true, approximately circular configuration, both when tightened into locking position about the rim and when expanded to permit unhooking of the bead of the shoe and removal of the inner tube. At the same time, it must be substantially incapable of transverse distortion, in order that it may afford a substantial incompressible lock wedge for the toes of the shoe. I prefer to make the wedge strip a band of metal without side flanges, since when made of the thickness desirable for resisting lateral and peripheral stresses, the side surfaces will present an approximately desirable area of surface contact with the surface of the toes. Such bearing face will be small enough so that contracting the band to effect the desired degree of compression of the material of the toe will not require too great power. Cutting effect on the fabric may be avoided by inclosing it in a heavy sheath of fabric or other suitable material, as, for instance, by wrapping it with tire tape or similar material, preferably secured by an adhesive binder, such as varnish. A few layers of such winding will serve to round off, mask, and cushion the edges of the band, and also by increasing the thickness of such sheath, the area of the sides which bear upon the shoe may be increased to any desired extent. The sheath also serves to protect the metal from rust and the material of both shoe and inner tube from injurious contact therewith.

In order that the lock strip may always be forced against the converging surfaces of the shoe with the required wedging pressure and with the pressure approximately equal at all points about the periphery, the lock strip should be proportioned to the depth, degree of convergence, and peripheral length of the wedge channel formed by the converging wedge surfaces of the toes, so that there will always be a clearance between the lower surface of the strip and the bottom of the channel in the rim, notwithstanding the slight variations in size or shape of commercially obtainable shoes. In order to insure the desired certainty, uniformity, and equality of the pressure of the strip at all points about the periphery, positive anchoring of the strip to the rim should be limited to the smallest possible number of points, and preferably it should be limited to the point where the passage of the valve stem through the rim requires that circumferential slip be prevented.

I prefer that the strip should be initially formed and sized, so that it will open by its own elasticity to a diameter approximately such as is necessary for disengagement of the bead of the shoe from the rim, some form of take up being provided for the purpose of contracting the strip back into locking engagement with the toes of the shoe. The means for locking the strip in the latter position is preferably so designed as to lock the ends of the strip to each other in the contracted position without locking the strip to the rim.

Preferably the lock strip and the valve stem connections with the inner tube must all lie within the rim channel and must not project peripherally beyond the circumference of the rim flanges. Otherwise, a very few revolutions of the wheel when running flat will tear the inner tube away from the valve stem.

The continuous lock strip affords a substantially uniform bottom wall for the inner tube free from the relatively abrupt inequalities which occur where the shoe is secured by the ordinary short lugs distributed at considerable intervals, thereby preventing undue strain on the inner tube. It holds the beads of the shoe in contact with the bottom of the rim channel at all points in the circumference, so that neither can be displaced by violent lateral strains, such as result from skidding or taking corners at high speed. This insures water tight closure of the tire cavity at all times and prevents the inner tube from being pinched or blown if, for any reason, some portion of the toe should lift.

Further details of the construction and operation of my invention will appear from the detailed description of certain practical embodiments thereof, which I have selected for illustration in the annexed drawings, wherein—

Figure 1 is a cross-section through a rim and tire showing the take up and securing mechanism of the lock strip for the tire shoe; Fig. 2 is a similar section taken at the valve stem; Fig. 3 is a detail plan view of the overlapping end portions of the continuous lock strip, the sheath being shown in section; Fig. 4 is a similar view of a modified form; Fig. 5 is a detail view taken on the line V—V, Fig. 4; Fig. 6 is an enlarged detail plan view showing a modified construction at the point where the strip enters the sheath; Fig. 7 is a view similar to Fig. 1, showing a modified arrangement of the take up and securing means for the lock strip; Fig. 8 is a bottom view of the rim and closure therefor shown in Fig. 7; Fig. 9 is a section on the line W—W, Fig. 8; Figs. 10 and 11 are respectively side elevation and plan view of one form of lock strip; Fig. 12 is a cross-section on the line X—X, Fig. 11; Figs. 13 and 14 are respectively plan view and cross-section of a modified form of lock strip; Figs. 15, 16, and 17 are respectively side elevation, cross-section, and longitudinal section of still another modified form of lock strip.

Figs. 1 and 2 show the relation of the lock strip to the shoe at the take up and at the valve stem respectively. It will be understood that these are preferably at diametrically opposite points of the rim, that the lock strip extends continuously about the periphery, and that it may have any of the forms shown in Figs. 10 to 17 or any desired variation thereof.

The rim 1 is flattened across the bottom to correspond approximately to the cylindrical periphery of the felly to which it is to be fitted, and is provided with overhanging, inturned side flanges 2, 2.

The tire comprises the inner air tube 3, confined by the shoe 4, which is formed with laterally projecting beads 5, 5, adapted to fit into the annular grooves formed by the inturned flanges and against the flattened bottom of the channel in the rim, as at 6. The interior surfaces 7, 7 of the shoe 4 converge to form a wedge shaped locking channel. Fitted within this channel is the locking wedge 8, whereby the beads of the shoe are forced apart and into the annular recesses under the projecting flanges of the rim. This locking wedge forms part of or is secured by a tension connection preferably extending entirely about the periphery, and for convenience this part of the device may be termed a lock strip. The entire strip is preferably provided with a canvas covering, the top portion and side flaps of which may be as indicated at 4ª. From the drawings, it will be evident that the beads 5, 5 cannot be unhooked so long as the locking means remains in place, and also that any stress tending to unhook the bead, takes effect both as a laterally directed compression upon said locking means, transmitted to and resisted by compression upon the opposite toe, and also as a radial strain transmitted by tension longitudinally of the strip and resisted at all points around the periphery by radial compression on both toes of the shoe.

As will be evident from Figs. 1 and 3, the lock strip is formed at the take up with cut away and overlap portions 9, 9, slidably engaging a guide or sheath, which preferably comprises a channel iron 10, closed in at the top by a cover plate 11, which is made of ample thickness and is soldered or brazed at the edges to the side flanges of said channel iron. Adjacent edges of the cut away portions 9 of lock strip 8, are formed with oppositely directed racks 12, engaging gear teeth 13 on an intermediate pinion 14. The ends 15 of the lock strip are preferably wide enough to fit the guide or sheath and are formed with guide surfaces 16, 17, adapted to bear upon each other laterally to form mutually guiding and spacing members, thereby insuring smooth operation of the pinion and racks, and stiffening the joint against side bending when removing lug and shoe. The length of each lateral bearing surface 16 from the shoulder 18 to the rack 12 should be slightly greater than the combined lengths of both racks, for otherwise a surface 17 will come into register with the narrower cut away portion at the rack and will lose its guiding and stiffening function whenever the lock strip is expanded. The guide surfaces 16—17 may be shortened by arranging the parts as shown in Figs. 4 and 5, where the guide surfaces 17 bear upon the intermediate partitions 19, 19, formed upon or secured to the sheath. In this case, the guide surface 16 need be only a little longer than the rack 12. This is because in Fig. 3, the engaging surfaces 16, 17 travel in opposite directions, and the relative movement is equal to the sum of the movements of both racks, whereas in Fig. 4 one guiding surface is on the partition 19 which is relatively stationary, so that the relative movement is equal to the movement of one rack.

The ends of the recesses for the racks 12, 12 are formed with curved shoulders 20, 20 and 21, 21 respectively. The shoulders 21 nearest the ends of the strip form stops for the pinion 14 when the strip is expanded to its greatest diameter, while the shoulders 20 perform similar functions when the strip is contracted to the minimum diameter. The strip is proportioned so that when in use, the edges of the shoe will be firmly wedged in place, before the ends of the strip have been overlapped to the extreme limit indicated in Figs. 1 and 4.

The pinion is mounted in operative relation to the sheath and to the racks, and the parts are locked in any desired position of overlap by any suitable means, it being particularly desirable, however, that they be locked to each other independently of any engagement with the rim 1. As shown in Fig. 1, the pinion 14 may be integral with the shaft 22 journaled in the cover plate 11 and channel iron 10. In the arrangement shown in Fig. 1, the pinion 14 is cut on the under side with downwardly projecting teeth 23, which may correspond in number and position to the gear teeth 13. These teeth are adapted to fit into corresponding flat V-shaped indentations 24 on the upper interior surface of 10. The teeth 23 and indentations 24 are preferably much smaller in proportion to the thickness of the pinion than is indicated in Fig. 1, wherein the size has been exaggerated for purposes of illustration. The indentations 24 are preferably cut at an obtuse angle, say an angle of 100 degrees, so that the corresponding projections 23 on the under side of the pinion may be wedged out of engaging relation thereto by slight relative movement in a direction parallel to the axis of the pinion 14. The contraction of the lock strip is accomplished by permitting such longitudinal movement, thereby permitting rotary movement of the pinion, while locking of the parts is accomplished by positively securing them against the longitudinal movement, thereby preventing the rotary movement. In the specific arrangement shown, both matters are provided for by making the pinion 14 and projection 23 so that they fit snugly within the space between 10 and 11, and hence continuously tend to maintain a position of locking engagement. This engagement is not positive, however, and when a moderate effort is applied to rotate the pinion, the projections act as face cams, to spring the case 10 downward, thus permitting rotation against a certain definite resistance. In order that such non-positive engagement may be made positive at will, the shaft 22 of the gear 14 is provided on its lower end with a right hand thread, on which is screwed a right hand lock nut 25, which bears against an intermediate right hand lock washer 26 of ordinary construction, adapted to resist turning of the nut 25 to the left. When the lock nut 25 has been loosened, the springiness of the case 10 allows the teeth 23 to revolve upon the application of power sufficient to spring the case 10 and teeth 24 out of engagement with the teeth 23. This resistance is sufficient to prevent accidental rotation of the pinion and closing of the lock strip when it is desired to retain it in the open position for the purpose of changing tires, tubes, etc., and yet not sufficient to prevent rotation when a wrench is applied to the square end 28 of shaft 22 for the purpose of positively contracting the lug strip to wedge the beads of the tire under the flanges of the rim. When it is desired to positively lock the strip in any desired position, the nut 25 is screwed tight so that the projections 23 on the lower side of the pinion are positively clamped into forcible engagement with the corresponding indentations 24, in the case 10, thereby securely locking the pinion to the case independently of the springiness of the latter. It will be noted that in the arrangement shown, tension strain tending to open the lock strip tends to rotate the pinion 14 to the right, and that the clamping nut is tightened by screwing to the right. Hence, any slip due to tensional strain upon the lug strip tightens the nut 25.

The opening in the rim through which the wrench may be applied to rotate the pinion 14 or to screw up the lock-nut 25, is closed by a disk cap 30, provided with a leather washer or packing 31. It will be noted that the lock strip is not secured to or by this cap, and hence the latter need have only a short screw thread bearing, which may be cut directly in the material of the rim, and the cap may be made thin so as to be substantially flush with the felly engaging surface of the rim when the latter is slightly countersunk, as shown in Fig. 1.

In Figs. 6 to 10, I have shown a modification of the above described take up and sheath. In Fig. 6, the lock strip 8 is attached at the end to connecting members 39 by means of screws or rivets 40, the ends of flanges 4 of the lock strip being tapered off as at 41. This arrangement has the advantage that the overlapped ends of the lock strip may be of a desired thickness and quality of steel suitable for gear teeth of any desired strength, quite independently of the quality of the metal used for the main portion of the lock strip which extends around the wheel. Referring to Figs. 7, 8, and 9, it will be seen that the cut away and overlapped portions 49, 49 and the pinion 44 engaging therewith, channel iron 48 and cover piece 50, may be similar to the corresponding parts shown in Fig. 1. The securing nut 55 of spring washer 56 may also be the same. Fig. 7 differs from Fig. 1, however, in that the end of the shaft 57, upon which the pinion 44 is mounted, is enlarged as at 58. Moreover, the pinion and case are not provided with locking projections, but, on the contrary, a slight space is left between the bottom of the pinion and the surface of the lower case member 48. By this construction, screwing up on the tightening nut 55 serves to spring the case into clamping engagement with the ends of the lock strip. The opening in the rim cavity, through which the take up is adjusted and locked, is made oblong, so that the take up devices may be reached by tools even when displaced slightly to one side or the other. This oblong opening into the rim cavity is closed by a plate 60, pivoted upon a screw 61, adapted to latch under the head of another screw 62. When swung to latched position, both screws 61 and 62 may be tightened to securely hold the cover in place. The screws may be upset as at 65 to prevent removal and possible loss when the plate is unfastened. A gasket 63 is provided between the cover and the rim to render the closure tight against entrance of dust, mud, water, etc.

The lock strip 8 is provided, preferably at a point diametrically opposite the take up, with a hole 68, adapted to receive the clamping nut 69 of the valve stem 70, whereby the clamping members 71, 72 of the valve stem 73 are clamped to the elastic inner tube 3. By this means, it is possible to have the outermost projection of the valve stem at 71 well within the periphery of the rim 1, so as to be protected thereby when running flat. The valve stem projects through the bottom of the rim 1, and is secured by clamping nut 74, provided with elastic packing 75, adapted to be tightened against the rim to form a watertight closure for the valve stem passage after the wedge strip 8 has been forced inwardly to locking position.

It will be noted that in all of the cross-sectional views there is clearance at 76 between the rim 1 and the bottom of the lug strip 7, so that in all cases the tightening of the lock strip takes effect upon the toes of the shoe rather than upon the rim. The valve stem being flattened at the sides, the clamping member 72, valve opening in the rim, and packing washer 75 are shown as fitting the flattened sides, while the clamping nuts 69 and 74 are circular to correspond with the cylindrical screw threaded portion of said stem, and hence in Fig. 2 they appear to be of larger diameter than the stem.

Figs. 10 to 17 show various constructions for the lock strip at points intermediate the take up and the valve stem. In the form shown in Figs. 10 to 12, the body of the strip is a band 8, with edges beveled at 88 to correspond to the walls of the wedging recess between the toes of the shoe. It is provided with integrally formed flanges 89, which preferably have their outer or wedging surfaces 90 arranged flush with the bevel edges 88 of the strip 8. The number, length, and space between these flanges may be varied greatly. In some cases, I may use only such number as may be useful in holding the partially expanded inner tube out of the way, while assembling the clenching bead of the shoe under the inturned flange of the rim. In other cases they may be practically continuous and the space between them cut away only enough to give the clearance necessary to prevent the possibility of pinching the inner tube in the slits between sections of the flange when the lug strip is expanded to its maximum diameter. By reference to Figs. 10 and 11 particularly, it will be noted that the cut away portions at 91 are characteristically V-shaped, so as to avoid such possibility of pinching when the strip is expanded and that the adjacent ends of the flanges are rounded at the edges, tops 92 and bottoms 93. It will be noted that the greater the space 91 between the flanges, the more flexible will the lock strip be for a given thickness of material. By varying the proportions of thickness of strip, length of flange portions, and length of spaces between flanges, I may vary the flexibility within wide limits. In the form shown in Figs. 13 and 14, the side flanges are shown as separate, integral strips comprising a bottom portion 93 and flange portions 94, 94, secured to the bottom of the lock strip 8 by a rivet 95. The flanges 94 are recessed into the edges of the lock strip, as indicated at 96, so that their outer shoe engaging surfaces are flush with the beveled edges of the lock strip 8. In Figs. 15 to 17, I have shown a lock strip comprising a band 8 bound with successive layers of tape 97, 98, preferably wound in opposite directions, as indicated in Fig. 15. A desirable way of forming such a lock strip is to apply varnish or other binder and then wind with a canvas strip, then again apply varnish or binder, then wind with canvas strips in the opposite direction, and so on successively, until the thickness of the covering is approximately equal to the thickness of the material of the strip. Before the varnish has completely set, the covering may be shaped to conform to the convergence of the toe of the shoe with which it is to be used by molding in any suitable way, one very effective method being to put it in the tire, clench the shoe, and inflate the inner tube. In such case, it is desirable that no varnish be applied to the outermost layer of canvas or else that it be liberally supplied with powdered talc to prevent sticking. By this expedient, the thickness of the metallic portion of the lock strip and its resulting stiffness may be substantially independent of the area of surface of wedging engagement of the strip with the shoe, so that the strip may be very flexible and at the same time may have as large an area of engagement as may be desired.

With respect to the form of shoe, rim and clenching beads shown in the drawings, it will be appreciated by those skilled in the art that the bead and toe of the shoe are sufficiently elastic to permit of the slight stretching necessary to introduce the same into the rim channel; that when the beads are interlocked with the inturned flanges and the inner tube is inflated the expansive and other transverse stresses on the shoe take effect almost directly upon the edges of the flanges at outward acute angles; that as against such stresses the clenching beads have a positive locking engagement with the flanges and if prevented from displacement are capable of successfully withstanding all such strains; that the proportions of parts are such that such displacement can only occur by inward lateral movement either bodily or pivotally about the edge of the flange as a center; that the relation of parts and the leverages are such that the power required to prevent the initiation of any such movement laterally or with a lateral component, is very much less than the power required to check and withstand such movement after it has once been initiated, and, finally, that by my invention whereby a continuous lock strip prevents initiation of any such movement at any and all points about the periphery, the actual strain on the lock strip under normal running conditions is not very great and such stress as there is is transmitted transversely across the lock strip as a thrust block and circumferentially around the same. By reason of the fact that in normal operation my lock strip is only required to oppose the initiation of an unlocking movement of the bead, it becomes possible to combine in an elastic metal lock strip a sufficient transverse and torsional rigidity together with the longitudinal flexibility without which the operations of expanding and contracting the strip to the required extent would become impracticable. The combination of these qualities once achieved, it is not difficult to introduce the further quality of elasticity whereby the strip will open up on approximately true circles the curvature of which increases and decreases in substantial accordance with the increase and decrease of radius.

While I have herein fully shown and described, and have pointed out in the appended claims certain novel features of construction, arrangement, and operation which characterize my invention, it will be understood by those skilled in the art that various omissions, substitution, and changes in the forms, proportions, sizes, and details of the device and of its operation may be made without departing from my invention.

I claim:

1. In combination, a clencher rim, a clencher tire mounted thereon, a continuous, transversely rigid, expansible and contractible lock strip positioned between the beads of the tire casing, the edges of the lock strip when in locking position contacting with the tire casing nearer the axis of the rim than the outer edges of the rim flanges and leaving a clearance space between the lock strip and the base of the rim, and means independent of the rim to contract and expand the lock-strip.

2. In combination, a clencher rim, a clencher tire mounted thereon, a substantially continuous, transversely rigid, expansible and contractible lock-strip positioned between the beads of the tire casing, the edges of the lock-strip when in locking position contacting with the tire casing nearer the axis of the rim than the outer edges of the rim flanges and leaving a clearance space between the lock-strip and the base of the rim, the width of the strip being such as to lock the beads of the tire casing firmly within the rim flanges when in such position and means independent of the rim to contract and expand the lock-strip.

3. In combination, a clencher rim, a clencher tire mounted thereon, a substantially continuous, transversely rigid, radially flexible, expansible and contractible, metallic lock-strip positioned between the beads of the tire casing, the edges of the lock-strip when in locking position contacting with the tire casing nearer the axis of the rim than the outer edges of the rim flanges and leaving a clearance space between the lock-strip and the bottom of the rim cavity, and means independent of the rim to contract and expand the lock-strip.

4. In combination, a clencher rim, a clencher tire mounted thereon, a practically continuous, transversely rigid, expansible and contractible lock-strip positioned between the beads of the tire casing, the edges of the lock-strip when in locking position contacting with the tire casing nearer the axis of the rim than the outer edges of the rim flanges and leaving a clearance space between the lock-strip and the base of the rim, and means independent of the rim to contract and expand the lock-strip said means being such as to allow the pressure of the fluid within the inner tube to force the lock-strip into locking position.

5. In combination, a clencher rim, a clencher tire mounted thereon, an expansible and contractible lock-strip positioned between the beads of the tire casing, the edges of the lock-strip when in locking position contacting with the tire casing nearer the axis of the rim than the outer edges of the rim flanges and leaving a clearance space between the lock-strip and the bottom of the rim cavity, and means independent of the rim to contract, expand and lock the lock-strip in its contracted position.

6. In combination, a clencher rim, a clencher tire mounted thereon, an expansible and contractible lock-strip positioned between the beads of the tire casing, a contracting and expanding device for the said lock-strip including a sheath inclosing the expansible portion of the lock-strip, the frictional contact between the sheath and the inclosed portion of the lock-strip being such as to hold the partially deflated inner tube out of contact with the beads of the tire casing and means independent of the rim to expand, contract and lock the said lock-strip in its contracted position.

7. In combination, a clencher rim, a clencher tire mounted thereon, an expansible and contractible lock-strip positioned between the beads of the tire casing, the said lock-strip being substantially wedge-shape in cross section the inclination of the sides being such as to fit the inner sides of the beads of the tire casing and when in locking position to contact with the said casing nearer the axis of the rim than the outer edges of the rim flanges and leave a clearance space between the lock-strip and the bottom of the rim cavity and means independent of the rim to contract and expand the lock-strip.

Signed at New York city, in the county of New York and State of New York, this 24th day of July, A. D. 1909.

MILLER REESE HUTCHISON.

Witnesses:
GEORGE C. DEAN,
IRVING M. OBRIEGHT.